(12) United States Patent
Yang et al.

(10) Patent No.: US 12,353,802 B1
(45) Date of Patent: Jul. 8, 2025

(54) MODEL-BASED ADAPTIVE MULTI-APERTURE OPTICAL FIBER COUPLING CONTROL SYSTEM AND METHOD

(71) Applicant: JINLING INSTITUTE OF TECHNOLOGY, Nanjing (CN)

(72) Inventors: Huizhen Yang, Nanjing (CN); Xianshuo Li, Nanjing (CN); Peng Chen, Nanjing (CN); Zhengqing Qi, Nanjing (CN); Ronggang Zhu, Nanjing (CN)

(73) Assignee: JINLING INSTITUTE OF TECHNOLOGY, Nanjing (CN)

( * ) Notice: Subject to any disclaimer, the term of this patent is extended or adjusted under 35 U.S.C. 154(b) by 0 days.

(21) Appl. No.: 19/026,409

(22) Filed: Jan. 17, 2025

Related U.S. Application Data

(63) Continuation of application No. PCT/CN2024/141700, filed on Dec. 24, 2024.

(30) Foreign Application Priority Data

Jun. 27, 2024  (CN) .......................... 202410840767.9

(51) Int. Cl.
*G06F 30/18* (2020.01)
*G06F 111/10* (2020.01)

(52) U.S. Cl.
CPC .......... *G06F 30/18* (2020.01); *G06F 2111/10* (2020.01)

(58) Field of Classification Search
CPC ...... G06F 30/18; G06F 2111/10; G06F 30/12; G06F 2119/22
See application file for complete search history.

(56) References Cited

U.S. PATENT DOCUMENTS

| 4,076,425 A | * | 2/1978 | Saltz | G01N 21/534 |
| | | | | 250/575 |
| 2009/0137990 A1 | * | 5/2009 | Sheinis | G02B 21/0072 |
| | | | | 606/5 |

(Continued)

FOREIGN PATENT DOCUMENTS

CN  104034434 A  9/2014

OTHER PUBLICATIONS

Reza Nasiri Mahalati, Daulet Askarov, Jeffrey P. Wilde, and Joseph M. Kahn: "Adaptive control of input field to achieve desired output intensity profile in multimode fiber with random mode coupling" pp. 1-17, (Year: 2012).*

*Primary Examiner* — Kibrom K Gebresilassie

(57) ABSTRACT

The disclosure relates to the technical field of optical engineering, and in particular to a model-based adaptive multi-aperture optical fiber coupling control system and a model-based adaptive multi-aperture optical fiber coupling control method. The system includes an optical fiber coupler array, optical fibers, photoelectric detectors, a controller and a high-voltage amplifier, where a plurality of optical fibers and photoelectric detectors are arranged, the optical fiber coupler array consists of a plurality of optical fiber couplers, output ends of the optical fiber couplers are respectively connected with input ends of the photoelectric detectors through the optical fibers, output ends of the photoelectric detectors are respectively connected with input ends of the controller, output ends of the controller are respectively connected with input ends of the high-voltage amplifier, and output ends of the high-voltage amplifier are respectively connected with the optical fiber couplers.

2 Claims, 3 Drawing Sheets

(56) References Cited

U.S. PATENT DOCUMENTS

2016/0338592 A1* 11/2016 Masumura ............ A61B 5/0059
2022/0260454 A1* 8/2022 Oda ....................... G01M 11/39

* cited by examiner

MODEL-BASED ADAPTIVE MULTI-APERTURE OPTICAL FIBER COUPLING CONTROL SYSTEM AND METHOD

TECHNICAL FIELD

The present disclosure relates to the technical field of optical engineering, and in particular to a model-based adaptive multi-aperture optical fiber coupling control system and a model-based adaptive multi-aperture optical fiber coupling control method.

BACKGROUND

Adaptive optics technology can improve image quality or system performance and has been applied to fields such as astronomical observation, laser communication, and microscopic imaging. Free Space Optical Communications (FSOC) is a novel communication method that has emerged in recent years, characterized by its fast transmission rate, strong information capacity, and excellent security. Optical fiber couplers, as one of the core components in FSOC systems, are used to achieve signal coupling and distribution between optical fibers. After coupling and distribution, the laser signals enter the optical fiber receiver end. The overall performance of the optical fiber receiver end, including the optical fiber coupler, represents the quality of the laser communication system. However, in actual FSOC applications, the presence of atmospheric turbulence along the laser transmission path greatly reduces the efficiency of optical fiber coupling, falling far short of the theoretical values for optical fiber coupling efficiency. Therefore, how to suppress or reduce the impact of atmospheric turbulence on the coupling efficiency of laser signals and improve the coupling efficiency at the optical fiber receiver end is a hot topic and goal in the field of space laser communication research in recent times.

At present, an optical fiber receiving end often uses a stochastic parallel gradient descent algorithm (SPGD-Stachastic Parallel Gradient Descent Algorithm JOSA, 1998, 15 (10): 2745-2758) to control an optical fiber coupler array so as to improve the optical fiber coupling efficiency. However, due to the dynamic changes in atmospheric turbulence, an SPGD algorithm with slow convergence speed is difficult to meet the requirements of practical applications. To further enhance the performance of laser communication systems, it is essential to investigate control methods with faster convergence rates, enabling adaptive fiber couplers to swiftly identify optimal control parameters and thereby increase the efficiency of fiber coupling.

SUMMARY

The present disclosure aims to provide a model-based adaptive multi-aperture optical fiber coupling control system and a model-based adaptive multi-aperture optical fiber coupling control method, so as to address the technical issues mentioned in the aforementioned background.

In order to achieve the above purpose, the technical scheme of the disclosure is as follows:

A model-based adaptive multi-aperture optical fiber coupling control system includes an optical fiber coupler array, optical fibers, photoelectric detectors, a controller and a high-voltage amplifier, where a plurality of optical fibers and photoelectric detectors are arranged, the optical fiber coupler array consists of a plurality of optical fiber couplers, output ends of the optical fiber couplers are respectively connected with input ends of the photoelectric detectors through the optical fibers, output ends of the photoelectric detectors are respectively connected with input ends of the controller, output ends of the controller are respectively connected with input ends of the high-voltage amplifier, and output ends of the high-voltage amplifier are respectively connected with the optical fiber couplers.

Further, the optical fiber coupler includes a receiving aperture, sub-apertures, a coupling lens and a back focal plane, where a plurality of sub-apertures are arranged; the receiving aperture, the sub-apertures, the coupling lens and the back focal plane are arranged in sequence; one end of the optical fiber is connected at the back focal plane; a distorted wavefront is incident on the receiving aperture of the optical fiber coupler, and then is divided into sub-beams by the sub-apertures of the optical fiber coupler; the sub-beams of the sub-apertures are focused by the coupling lens and form a focusing light spot on the rear focal plane, and part of the incident light is coupled into the optical fiber at the back focal plane; the coupled light beam is transmitted into the corresponding photoelectric detector through the optical fiber, converted into a corresponding electrical signal, and sent to the controller; the control algorithm in the controller calculates a corresponding control signal and transmits the corresponding control signal to the high-voltage amplifier, then the control signal is amplified by the high-voltage amplifier and then transmitted to the optical fiber coupler, the surface type opposite to the distorted wavefront is generated through the optical fiber coupler, and is superposed with the distorted wavefront to complete correction of the distorted wavefront, so that the optical fiber end face is controlled to find a maximum coupling efficiency point on the respective back focal plane.

Further, the optical fibers are single-mode optical fibers.

A model-based adaptive multi-aperture optical fiber coupling control method, characterized by including following steps:

step 1, initializing parameters of a control algorithm within the controller, using the fiber coupling efficiency as an objective function of the control algorithm;

step 2, preprocessing;

step 3, measuring and calculating the sum of light intensities of N sub-apertures;

step 4, adding the voltage perturbation of the X direction basis function with coefficient a to the N sub-apertures in parallel, and measuring and calculating the sum of the respective light intensities of the N sub-apertures; adding the voltage perturbation of the Y direction basis function with coefficient a again, and measuring and calculating the sum of the respective light intensities of the N sub-apertures;

step 5, performing a difference operation on the measured sum of the light intensities after perturbations by the N sub-apertures and the sum of the light intensities corresponding to the distorted wavefront;

step 6, calculating and obtaining coupler driving signals corresponding to the N sub-apertures by using the difference operation result; amplifying the driving signals by the high-voltage amplifier and applying the driving signals to a driver of the coupling lens for each sub-aperture; detecting corrected light spot information with the photoelectric detector, and calculating a system performance evaluation function for the current iteration based on the light spot information; and step 7, taking the corrected residual wavefront as the wavefront to be corrected, and repeating steps 3-6 to reach the preset termination condition and complete the correction.

Further, the preprocessing in the step 2 specifically includes the following steps: defining a set of basis functions $\{Z_x, Z_y\}$ for characterizing the wavefront tilt aberration, respectively recording as a tilt in the X direction and a tilt in the Y direction, calculating gradient second-order moments of $Z_x$ and $Z_y$ for x component and y component, inverting, and recording as P; measuring an influence function E of the coupling lens, establishing a cross-correlation matrix $C_{ze}$ between the coupling lens and the basis function, and calculating an autocorrelation coupling matrix $C_e$ between the influence functions of the driver, and using Equation (1) to obtain the driving signal of the coupling lens v;

$$v = C_e^{-1} C_{ze} a \quad (1)$$

where a is a variable scalar value.

Further, the step 3 is specifically as follows: taking the center of mass corresponding to each sub-aperture as the center, intercepting the image plane of the size M*M, and calculating the sum $I_{i0}$ of the respective light intensities of the N sub-apertures, where $i \in \{1, \ldots, N\}$.

Further, the step 4 is specifically as follows: adding a voltage perturbation of an X direction basis function with a coefficient of a to N sub-apertures in parallel, and calculating the voltage magnitude according to Equation (1), intercepting the image plane with the size M*M with the center of mass of each sub-aperture as the center, and calculating the sum $I_{ix}$ of the respective light intensities of part of the image surfaces intercepted by the N sub-apertures; adding a voltage perturbation of a Y direction basis function with a coefficient of a to N sub-apertures in parallel, and calculating the voltage magnitude according to Equation (1); intercepting the image plane with the size M*M with the center of mass of each sub-aperture as the center, and calculating the sum $I_{iy}$ of the respective light intensities of part of the image surfaces intercepted by the N sub-apertures.

Further, the step 5 is specifically as follows: performing a difference operation on the measured light intensities ($I_{ix}$, $I_{iy}$) after perturbations by the N sub-apertures and the light intensities $I_{i0}$ corresponding to the distorted wavefront to obtain an N×2-dimensional vector Q:

$$Q_i = \{(I_{ix}, I_{iy}) - I_{i0}\} \; i \in \{1, \ldots N\} \quad (2).$$

Further, calculating the driving signals in the step 6 is specifically as follows: obtaining a coupler driving signal $V_i$ corresponding to each of the N sub-apertures by using the following Equation (3), where V is an N-dimensional control signal;

$$V_i = \frac{P * Q_i}{2 * a} i \in \{1, \ldots N\}. \quad (3)$$

Further, the termination condition in the step 7 includes a certain number of iterations or an overall optical fiber coupling efficiency greater than a threshold.

Compared with the prior art, the disclosure has the following beneficial effects:

First, the model-based adaptive multi-aperture optical fiber coupling control method utilizes the mathematical relationship between the far-field light spot and the wavefront aberration to establish a model. Compared to existing blind optimization algorithms, it makes full use of physical principles, resulting in high reliability.

Second, utilizing the mathematical relationship between the far-field light spot and wavefront aberration to establish a model is equivalent to endowing the fiber coupling control system with certain prior knowledge. Controlling the system based on this prior knowledge significantly accelerates the convergence speed of the system.

Third, this technology exhibits strong robustness for fiber coupling applications under different turbulence intensities, significantly enhancing the coupling efficiency at the fiber reception end and improving signal quality.

DETAILED DESCRIPTION OF THE EMBODIMENTS

The present disclosure is further described in detail below with reference to the accompanying drawings and embodiments.

In practical application, the number of sub-apertures is generally 3, 7, 19, 37 and the like, and the self-adaptive optical fiber coupler array with the sub-aperture number of 19 is taken as an example, and the present disclosure is further described with reference to the accompanying drawings. In the embodiment, a Zernike polynomial is used as a basis function, and the actual implementation is not limited to a Zernike polynomial. The optical fiber coupling efficiency is used as an objective function of the control algorithm, the smaller the aberration is, the larger the system coupling efficiency is, and the coupling efficiency is not limited in the actual implementation.

Figure 1:
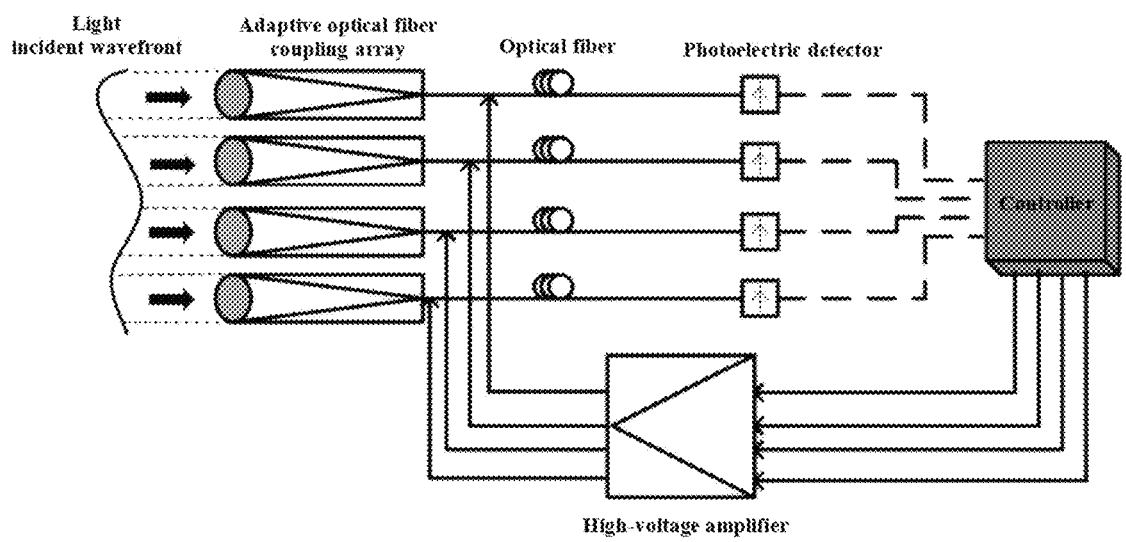
FIG. 1 is a schematic structural diagram of a model-based adaptive multi-aperture optical fiber coupling control system in the present disclosure.

As shown in FIG. 1, a model-based adaptive multi-aperture optical fiber coupling control system includes an optical fiber coupler array, optical fibers, photoelectric detectors, a controller and a high-voltage amplifier, where a plurality of optical fibers and photoelectric detectors are arranged, the optical fiber coupler array consists of a plurality of optical fiber couplers, output ends of the optical fiber couplers are respectively connected with input ends of the photoelectric detectors through the optical fibers, output ends of the photoelectric detectors are respectively connected with input ends of the controller, output ends of the controller are respectively connected with input ends of the high-voltage amplifier, and output ends of the high-voltage amplifier are respectively connected with the optical fiber couplers.

The optical fiber coupler includes a receiving aperture, sub-apertures, a coupling lens and a back focal plane, where a plurality of sub-apertures are arranged; the receiving aperture, the sub-apertures, the coupling lens and the back focal plane are arranged in sequence; one end of the optical fiber is connected at the back focal plane; a distorted wavefront is incident on the receiving aperture of the optical fiber coupler, and then is divided into sub-beams by the sub-apertures of the optical fiber coupler; the sub-beams of the sub-apertures are focused by the coupling lens and form a focusing light spot on the rear focal plane, and part of the incident light is coupled into the optical fiber at the back focal plane; the coupled light beam is transmitted into the corresponding photoelectric detector through the optical fiber, converted into a corresponding electrical signal, and sent to the controller; the control algorithm in the controller calculates a corresponding control signal and transmits the corresponding control signal to the high-voltage amplifier, then the control signal is amplified by the high-voltage amplifier and then transmitted to the optical fiber coupler, the surface type opposite to the distorted wavefront is generated through the optical fiber coupler, and is superposed with the distorted wavefront to complete correction of the distorted wavefront, so that the optical fiber end face is controlled to find a maximum coupling efficiency point on the respective back focal plane.

Figure 2:
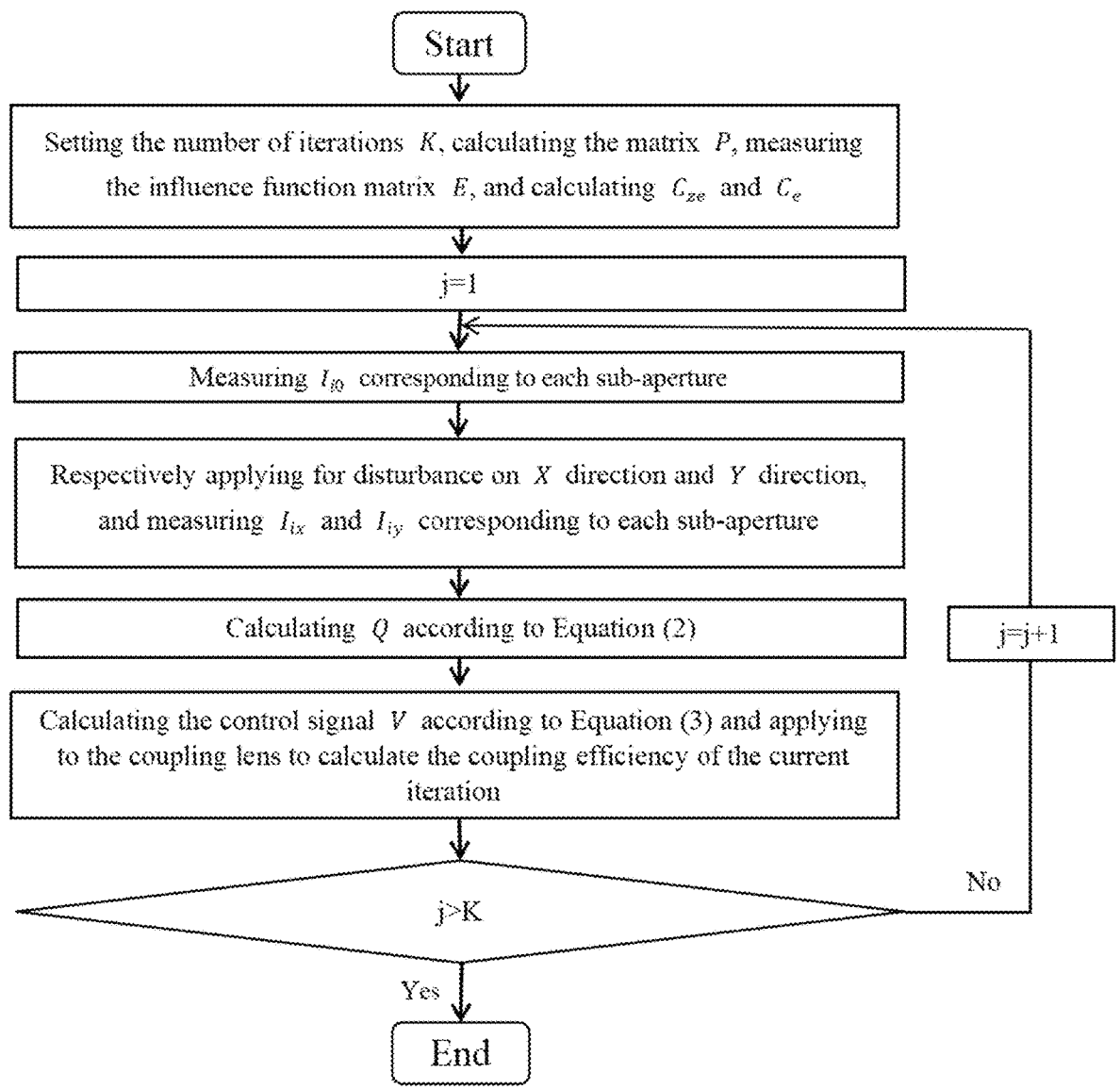
FIG. 2 is a flowchart of a model-based adaptive multi-aperture optical fiber coupling control method in the present disclosure.

As shown in FIG. 2, a model-based adaptive multi-aperture optical fiber coupling control method includes the following steps:

step 1, initializing parameters of a control algorithm within the controller, using the fiber coupling efficiency as an objective function of the control algorithm;

step 2, preprocessing; this part includes the calculation of the gradient inverse matrix P, the measurement of the influence function E of the coupling lens, the cross-correlation matrix $C_{ze}$ and the calculation of the autocorrelation coupling matrix $C_e$.

calculating gradient second-order moments of $Z_x$ and $Z_y$ for x component and y component, inverting, and recording as P according to the basis function $\{Z_x, Z_y\}$; measuring an influence function E of the coupling lens, and calculating the cross-correlation and autocorrelation coupling matrices $C_{ze}$ and $C_e$. The part of information is firstly calculated and has no relation with the wavefront to be corrected.

Step 3, taking the center of mass corresponding to each sub-aperture as the center, intercepting the image plane of the size M*M, and calculating the sum $I_{i0}$ of the respective light intensities of the 19 sub-apertures, where $i \in \{1, \ldots, 19\}$.

Step 4, adding a voltage perturbation of an X direction basis function with a coefficient of a to 19 sub-apertures in parallel, and calculating the voltage magnitude according to Equation (1), where the deformation and distorted wavefront produced by the coupling lens are superimposed, and after being focused by the focusing lens, some light spots enter the single-mode fiber and are detected by the photoelectric detector, measuring and calculating the sum $I_{ix}$ of the respective light intensities of part of the image surfaces intercepted by the 19 sub-apertures; similarly, adding a voltage perturbation of a Y direction basis function with a coefficient of a to the 19 sub-apertures in parallel, and obtaining the sum $I_{iy}$ of the light intensities corresponding to each sub-aperture.

Step 5, calculating the difference Q between the measured light intensities ($I_{ix}$, $I_{iy}$) after perturbations by the 19 sub-apertures and the light intensities $I_{i0}$ of the wavefront to be measured corresponding to each sub-aperture by Equation (2).

Step 6, using Equation (3) to obtain a drive signal $V_i$ of 19 optical fiber couplers corresponding to the distorted wavefront. The driving signal is amplified by the high-voltage amplifier and applied to the driver of the coupling lens of each sub-aperture in parallel, a surface type opposite to the wavefront to be detected is generated, and the driving signal is superposed to the wavefront to be corrected, so that the control over 19 optical fiber couplers is completed. According to the photoelectric detector information, the system performance evaluation function of the current iteration is calculated.

Figure 3:
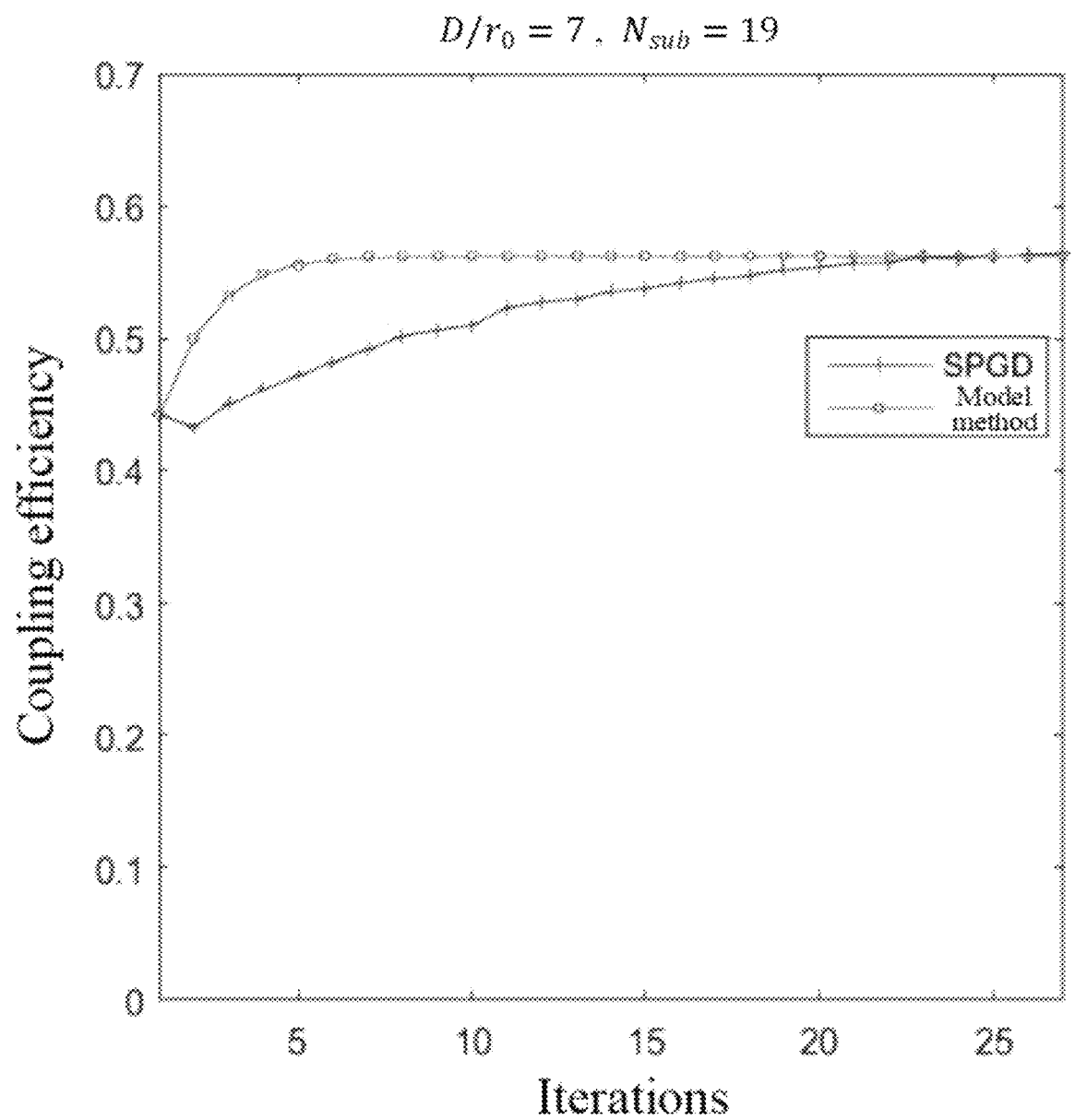
FIG. 3 is an example coupling efficiency comparison example of a model method and an SPGD method when a turbulence condition $D/r_0=7$ and when the number of the sub-apertures is 19, where D is the telescope aperture and $r_0$ is the atmospheric coherence length.

Step 7, repeating Steps 3-6 with the residual wavefront as the wavefront to be corrected. When the preset termination conditions are reached, such as a certain number of iterations or the overall optical fiber coupling efficiency is greater than a threshold, the closed-loop correction of the whole system is completed. An example of coupling efficiency comparison between the model method and SPGD method is shown in FIG. 3 when an atmosphere turbulence level $D/r_0$ is 7 and the number of the sub-apertures is 19.

The embodiments of the present disclosure are only preferred embodiments of the present disclosure and are not intended to limit the present disclosure in any form, and any simple modifications, equivalent replacements and improvements made to the above embodiments are still within the scope of protection of the technical solutions of the present disclosure by any person skilled in the art without departing from the scope of the technical solutions of the present disclosure.

What is claimed is:

1. A model-based adaptive multi-aperture optical fiber coupling control method, applied to a control system, comprising the following steps:

step 1, initializing parameters of a control algorithm within a controller of the control system, using a fiber coupling efficiency as an objective function of the control algorithm;

step 2, preprocessing;

wherein the preprocessing in the step 2 specifically comprises the following steps: defining a set of basis functions $\{Z_x, Z_y\}$ for characterizing a wavefront tilt aberration, respectively recording as a tilt in a X direction and a tilt in a Y direction, calculating gradient second-order moments of the basis function $Z_x$ and the basis function $Z_y$ for x component and y component, inverting, and recording as a gradient inverse matrix P; measuring an influence function E of a coupling lens of the control system, establishing a cross-correlation matrix $C_{ze}$ between the coupling lens and the basis functions, and calculating an autocorrelation coupling matrix $C_e$ between the influence functions of a driver, and using Equation (1) to obtain a driving signal of the coupling lens v;

$$v = C_e^{-1} C_{ze} a; \quad (1)$$

where a is a variable scalar value;

step 3, measuring and calculating a sum $I_{i0}$ of light intensities of N sub-apertures of the control system;

wherein the step 3 is specifically as follows: taking a center of mass corresponding to each sub-aperture as a center, intercepting an image plane of a size M*M, and calculating the sum $I_{i0}$ of the respective light intensities of the N sub-apertures, where $i \in \{1, \ldots, N\}$;

step 4, adding a voltage perturbation of an X direction basis function with a coefficient a to the N sub-apertures in parallel, and measuring and calculating a sum of respective light intensities of the N sub-apertures; adding a voltage perturbation of a Y direction basis function with the coefficient a again, and measuring and calculating a sum of respective light intensities of the N sub-apertures;

wherein the step 4 is specifically as follows: adding the voltage perturbation of the X direction basis function with the coefficient of a to the N sub-apertures in parallel, and calculating a voltage magnitude according to the Equation (1), intercepting the image plane with the size M*M with the center of mass of each sub-aperture as the center, and calculating the sum $I_{ix}$ of the respective light intensities of part of image surfaces intercepted by the N sub-apertures; adding the voltage perturbation of the Y direction basis function with the coefficient of a to the N sub-apertures in parallel, and calculating the voltage magnitude according to the Equation (1); intercepting the image plane with the size M*M with the center of mass of each sub-aperture as the center, and calculating the sum $I_{iy}$ of the respective light intensities of part of the image surfaces intercepted by the N sub-apertures;

step 5, performing a difference operation on the measured sum of the light intensities after perturbations by the N sub-apertures and the sum of the light intensities corresponding to a distorted wavefront;

wherein the step 5 is specifically as follows: performing the difference operation on the measured light intensities $(I_{ix}, I_{iy})$ after perturbations by the N sub-apertures and the sum $I_{i0}$ of the light intensities of the N sub-apertures corresponding to the distorted wavefront to obtain an N×2-dimensional vector Q:

$$Q_i = \{(I_{ix}, I_{iy}) - I_{i0}\} \; i \in \{1, \ldots N\} \quad (2);$$

where $Q_i$ represent a light intensity difference of an i-th sub-aperture;

step 6, calculating and obtaining coupler driving signals corresponding to the N sub-apertures by using results of the difference operation; amplifying the coupler driving signals by a amplifier and applying the coupler driving signals to the driver of the coupling lens for each sub-aperture; detecting corrected light spot information with a photoelectric detector, and calculating a system performance evaluation function for a current iteration based on the corrected light spot information;

wherein calculating the driving signals in the step 6 is specifically as follows: obtaining a coupler driving signal $V_i$ corresponding to each of the N sub-apertures by using the following Equation (3), where V is an N-dimensional control signal;

$$V_i = \frac{P * Q_i}{2 * a} \; i \in \{1, \ldots N\}; \quad (3)$$

and step 7, taking a residual wavefront as a wavefront to be corrected, and repeating the steps 3-6 to reach a preset termination condition and complete a correction of the distorted wavefront;

wherein the model-based adaptive multi-aperture optical fiber coupling control method comprises:

generating a surface type opposite to the distorted wavefront through an optical fiber coupler of the control system, superposing the surface type with the distorted wavefront to complete the correction of the distorted wavefront, and thereby controlling an optical fiber end face to find a maximum coupling efficiency point on a back focal plane to improve the fiber coupling efficiency.

2. The model-based adaptive multi-aperture optical fiber coupling control method according to claim 1, wherein the termination condition in the step 7 comprises a certain number of iterations or an overall optical fiber coupling efficiency greater than a threshold.

* * * * *